US008819251B1

(12) United States Patent
Lenz et al.

(10) Patent No.: US 8,819,251 B1
(45) Date of Patent: Aug. 26, 2014

(54) APPARATUS, SYSTEM, AND METHOD FOR MAINTAINING A PERSISTENT DATA STATE ON A COMMUNICATIONS NETWORK

(71) Applicant: priceline.com Incorporated, Norwalk, CT (US)

(72) Inventors: Christopher Lenz, Ridgefield, CT (US); Jonathan Taylor, Ridgefield, CT (US); Scott Nedderman, Monroe, CT (US)

(73) Assignee: Priceline.com Incorporated, Stamford, CT (US)

( * ) Notice: Subject to any disclaimer, the term of this patent is extended or adjusted under 35 U.S.C. 154(b) by 0 days.

(21) Appl. No.: 13/727,158

(22) Filed: Dec. 26, 2012

Related U.S. Application Data

(60) Continuation of application No. 11/627,332, filed on Jan. 25, 2007, now Pat. No. 8,380,856, which is a division of application No. 09/707,211, filed on Nov. 3, 2000, now Pat. No. 7,188,176.

(60) Provisional application No. 60/177,462, filed on Jan. 20, 2000, provisional application No. 60/178,986, filed on Jan. 28, 2000, provisional application No. 60/180,074, filed on Feb. 3, 2000.

(51) Int. Cl.
*G06F 15/16* (2006.01)

(52) U.S. Cl.
USPC ........... 709/228; 709/227; 709/220; 709/223; 709/237; 709/246; 709/249; 709/203; 709/201; 370/356

(58) Field of Classification Search
USPC ......... 709/228, 227, 220, 223, 237, 246, 249, 709/327, 201, 203
See application file for complete search history.

(56) References Cited

U.S. PATENT DOCUMENTS

| | | | |
|---|---|---|---|
| 5,165,020 A | 11/1992 | Sudana et al. | |
| 5,583,993 A | 12/1996 | Foster et al. | |
| 5,642,515 A | 6/1997 | Jones et al. | |
| 5,721,908 A | 2/1998 | Lagarde et al. | |
| 5,774,670 A | 6/1998 | Montulli | |
| 5,835,724 A | 11/1998 | Smith | |
| 5,889,945 A | 3/1999 | Porter et al. | |
| 5,913,029 A | 6/1999 | Shostak | |
| 5,964,836 A * | 10/1999 | Rowe et al. | 709/221 |
| 5,968,131 A | 10/1999 | Mendez et al. | |
| 6,041,357 A | 3/2000 | Kunzelman et al. | |
| 6,058,424 A | 5/2000 | Dixon et al. | |
| 6,076,108 A | 6/2000 | Courts et al. | |
| 6,088,451 A * | 7/2000 | He et al. | 726/8 |
| 6,098,093 A | 8/2000 | Bayeh et al. | |
| 6,141,749 A * | 10/2000 | Coss et al. | 713/162 |
| 6,286,034 B1 | 9/2001 | Sato et al. | |
| 6,289,395 B1 | 9/2001 | Apte et al. | |
| 6,370,562 B2 | 4/2002 | Page et al. | |
| 6,430,619 B1 | 8/2002 | Sitaraman et al. | |
| 6,463,501 B1 | 10/2002 | Kern et al. | |
| 6,484,187 B1 | 11/2002 | Kern et al. | |
| 6,539,494 B1 * | 3/2003 | Abramson et al. | 714/4.3 |
| 6,925,076 B1 | 8/2005 | Dalgic et al. | |
| 6,952,781 B1 | 10/2005 | Chang et al. | |

(Continued)

*Primary Examiner* — Jude Jean Gilles

(57) ABSTRACT

The present invention is an apparatus, system, and method for the improved tracking of a data state. The present invention allows session states to be maintained by sites that run on multiple, load-balanced servers. The present invention removes a single point of failure in a system, thus preventing all active sessions from being lost by providing persistent session data distributable across one or more machines over a communications network.

24 Claims, 8 Drawing Sheets

(56) References Cited

U.S. PATENT DOCUMENTS

| | | |
|---|---|---|
| 7,158,986 B1 | 1/2007 | Oliver et al. |
| 7,167,564 B2 | 1/2007 | Asano et al. |
| 7,272,230 B2 * | 9/2007 | Sasaki .......................... 380/278 |
| 8,073,129 B1 | 12/2011 | Kalavar |
| 8,116,446 B1 | 2/2012 | Kalavar |
| 2001/0021915 A1 * | 9/2001 | Cohen et al. .................... 705/14 |

* cited by examiner

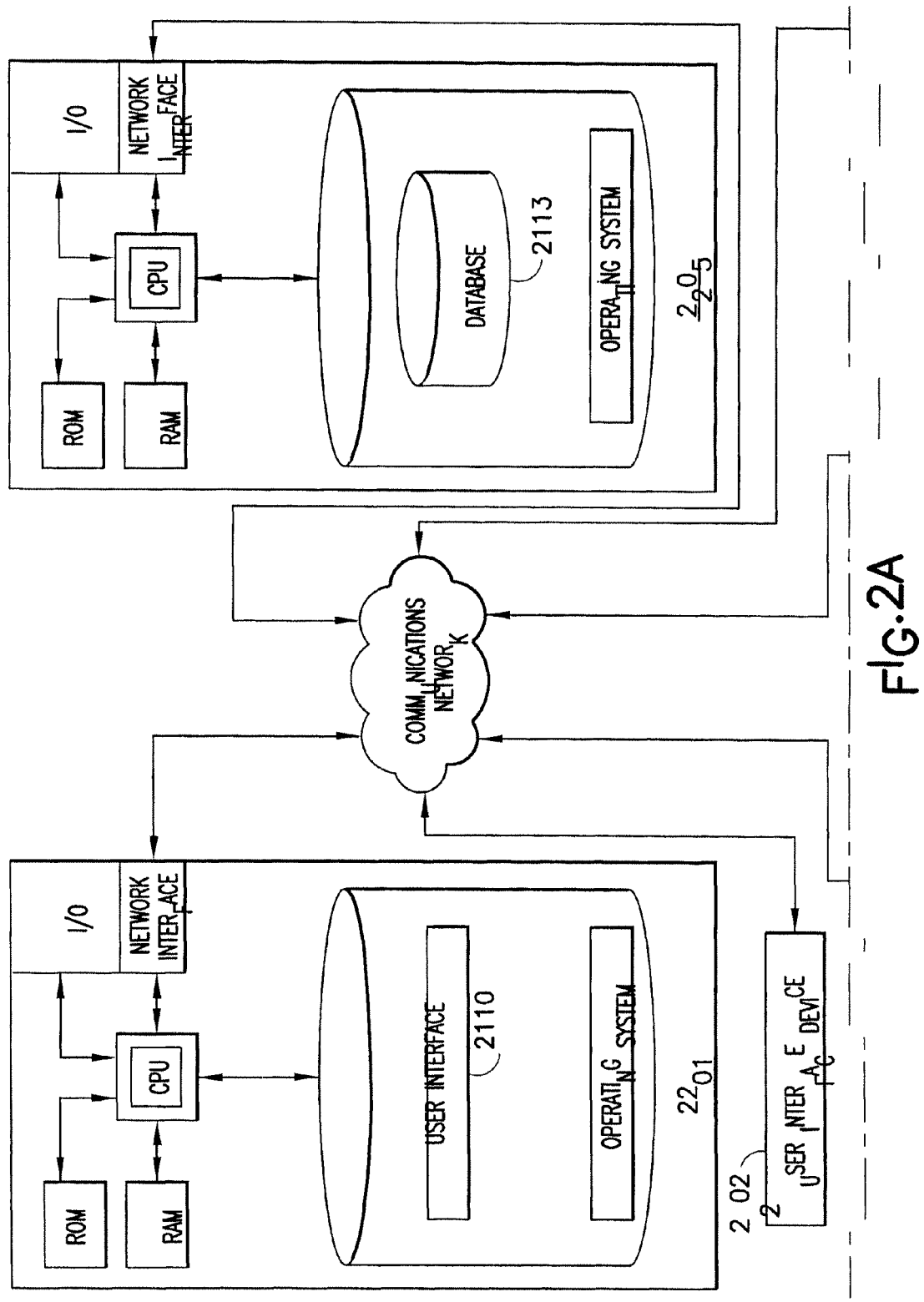

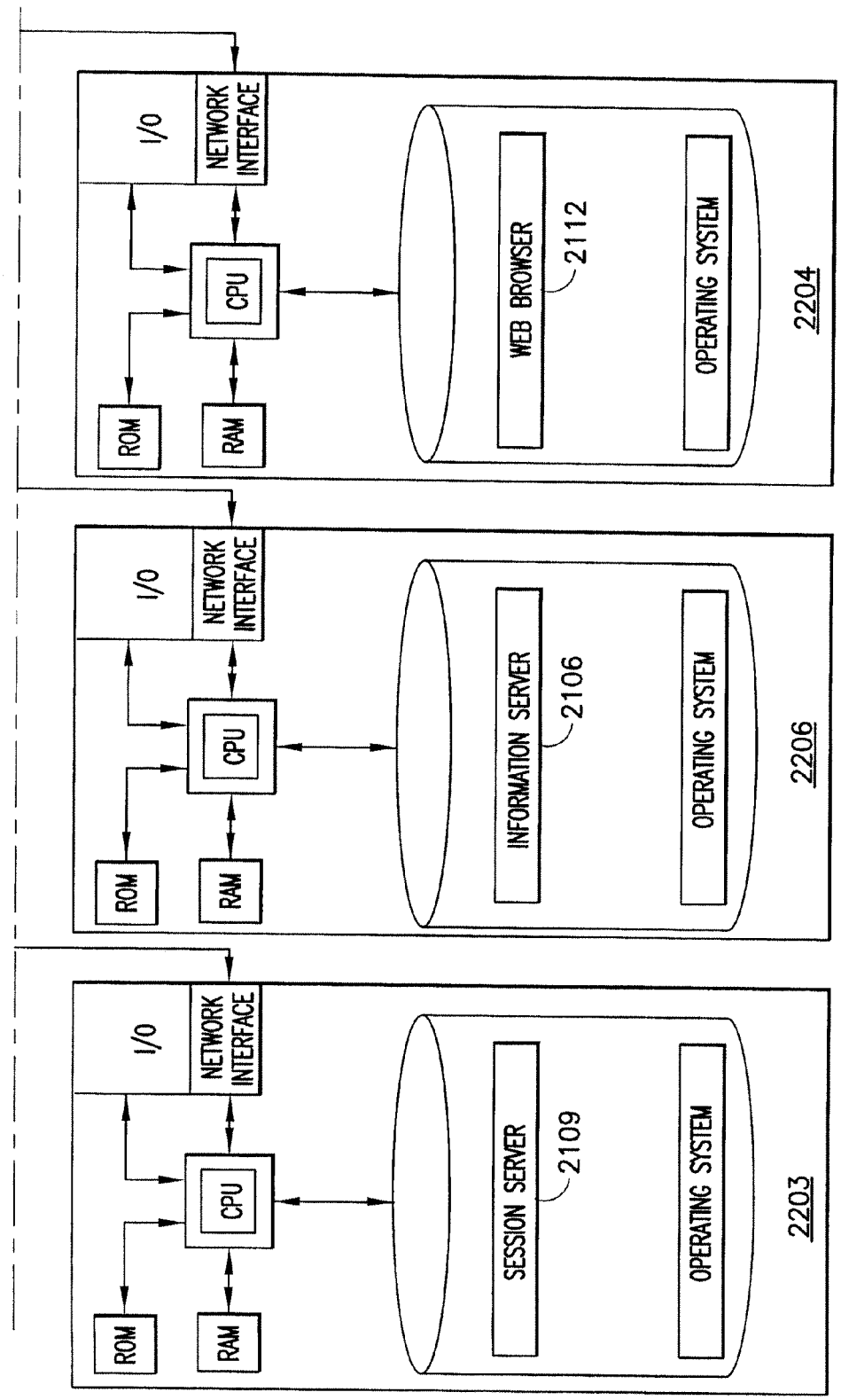

APPARATUS, SYSTEM, AND METHOD FOR MAINTAINING A PERSISTENT DATA STATE ON A COMMUNICATIONS NETWORK

CROSS-REFERENCE TO RELATED APPLICATIONS

The present application is a continuation of and claims priority under 35 USC §120 to prior application Ser. No. 11/627,332 filed Jan. 25, 2007, which in turn claims priority under 35 USC §120 to prior application Ser. No. 09/707,211 filed Nov. 3, 2000; the present application also claims priority under 35 USC §119 to U.S. provisional application No. 60/177,462, filed Jan. 20, 2000; U.S. provisional application No. 60/178,986, filed Jan. 28, 2000; and U.S. provisional application No. 60/180,074 filed Feb. 3, 2000. The entirety of the aforementioned applications are herein expressly incorporated by reference.

FIELD

The present application generally relates to computer systems and software, and more particularly to a method and system for a persistent data state on a communications network.

BACKGROUND

Information Technology Systems

Typically, users (i.e. people or other systems) engage computers to facilitate information processing. A computer operating system enables users to access and operate computer information technology. Information technology systems provide interfaces that allow users to access and operate systems.

User Interface

Computer user interfaces are analogous in many respects to automobile operator interfaces. Automobile operator interfaces such as steering wheels, gearshifts, and speedometers facilitate the access, operation, and display of automobile resources, functionality, and status. Similarly, computer user interfaces such as cursors, menus and windows facilitate the access, operation, and display of computer hardware and operating system resources, functionality, and status. Graphical user interfaces such as the Apple Macintosh Operating System or Microsoft's Windows provide a system for accessing and displaying information. Such consumer-oriented operating systems enable users to access and operate computer information technology by providing an integrated user interface. Other operating systems such as Unix do not provide integrated graphical user interfaces and instead allow various interfaces to be employed such as command line interfaces (e.g. C-shell) and graphical user interfaces (e.g. X windows).

World Wide Web

The proliferation and expansion of computer systems, databases, the Internet, and particularly the World Wide Web (the web), have resulted in a vast and diverse collection of information. Various user interfaces that facilitate the interaction of users with information technology systems (i.e. people using computers) are currently in use. An information navigation interface called WorldWideWeb.app, i.e. the web was developed in late 1990 on NeXT Computer Inc.'s operating system, NeXTSTEP, at the European Organization for Nuclear Research (CERN, a particle physics center). Subsequently, information navigation interfaces, i.e. web browsers, have become widely available on almost every computer operating system platform.

Generally, the web is the manifestation and result of a synergetic interoperation between user interfaces (e.g. web browsers), servers, distributed information, protocols, and specifications. Web browsers were designed to facilitate navigation and access to information, while information servers were designed to facilitate provision of information. Typically, web browsers and information servers are disposed in communication with one another through a communications network; i.e. information servers typically provide information to users employing web browsers for navigating and accessing information about the web. Microsoft's Internet Explorer and Netscape Navigator are examples of web browsers. In addition, navigation user interface devices such as WebTV have also been implemented to facilitate web navigation. Microsoft's Information Server and Apache are examples of information servers: their function is to serve information to users that typically access the information by way of web browsers.

Hypertext

Information on the web typically is provided through and distributed employing a HyperText Markup Language (HTML) specification. HTML documents are also commonly referred to as web pages. HTML documents may contain links to other HTML documents that can be traversed by users of web browsers (i.e. user interfaces) by selecting the links, which are commonly highlighted by color and underlining. HTML has been extended and upgraded resulting in new standards such as Extensible Markup Language (XML) and other such variants, which provide greater functionality. HTML's predecessor was Standardized General Markup Language (SGML), which in turn was preceded by the General Markup Language (GML). SGML is generally regarded as a more functional superset of HTML and first appeared in 1980 as a draft by the Graphic Communications Association (GCA) to the American National Standards Institute (ANSI) (GCA 101-1983); it was adopted as an international standard by the International Standards Organization (ISO) in 1986 (ISO 8879:1986). GML was first used to facilitate law office information system integration and improve document processing.

HTML documents typically are accessed through navigation devices via a HyperText Transfer Protocol (HTTP). HTTP is a stateless application-level protocol for distributed, collaborative, hypermedia information systems, and is further described at the World Wide Web Consortium organization (W3C) web site entitled HTTP Specifications and Drafts (available at www.w3.org/Protocols/Specs.html). Microsoft's Information Server allows the tracking of a state with a built-in session object.

The basic web browsing paradigm presents users with a scrolling page full of text, pictures, and various other forms of information media such as movies and links to other documents. Web browsers allow users to access uniquely identified HTML documents on the web by entering a navigation location in a Universal Resource Locator (URL) and employing HTTP as a transfer protocol to provide and obtain web pages. Typically, a user provides the address of a desired HTML document into a URL (either directly of through the selection of links in an already viewed HTML document).

Transactions

The onset of the web affected a tremendous increase in transactions occurring through insecure communications networks such as the Internet. Increasingly, such transactions occur via web page forms. In many instances, it is critical that data acquired over a communications network be acquired in a consistent, predictable, and reliable way. Otherwise, a host of problems may result such as failed transactions, application errors, incorrect orders, irritated customers, and other such consequences.

Many of the transactions occurring on the Internet have become more complex requiring a user to make multiple related interactions to complete a transaction.

These multiple related interactions are commonly referred to as a session. In other words, sessions refer to multiple user interaction states. Microsoft's Information Server may maintain a persistent state, i.e. a session. A persistent session makes an interaction state available for reference for a specified period of time.

SUMMARY

As set forth below, a need exists for an improved apparatus, system, and method for the tracking of a data state. Particularly, a need exists to create persistent session data across several information servers. Various attempts to solve this problem have been made. Such attempts include Microsoft's Information Server, which employs a built-in session object. Although this session object works for web sites running on a single server and with low reliability requirements, it is inoperable beyond that limited scale. The present application advances the art by allowing session states to be maintained by sites that run on multiple, load-balanced servers. The present application advances the art by removing a single point of failure in a system, thus preventing all active sessions from being lost by providing persistent session data distributable across one or more machines over a communications network.

In one embodiment, the present system includes an apparatus, comprising a processor, a storage medium communicatively connected to the processor, and a program stored in the storage medium. In one embodiment, the program further comprises a module to generate a user session key, a module to provide session information, and a module to associate session information with the session key. In another embodiment, the program comprises a module to generate a user session key, a module to provide the user session key, and a module to store the user session key. In a third embodiment, the program comprises a module to provide session information based on a current corresponding session key, and a module to store provided session information.

In other embodiments, the program comprises a module to recall session information based on a current and corresponding session key upon traversal of a web form segment, a module to obtain user provided information via the web form segment, a module to update the session information based on the current and corresponding session key, a module to validate the user provided information, and a module to post the user provided information to an information server if the user provided information is validated.

The above advantages and features are of representative embodiments only, and are not exhaustive and/or exclusive. They are presented only to assist in understanding the invention. It should be understood that they are not representative of all the inventions defined by the claims, to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

The accompanying drawings illustrate certain embodiments of the invention.

FIGS. 2A-B illustrate another embodiment of the present invention in the form of a distributed system interacting through a communications network;

DETAILED DESCRIPTION

Centralized Controller

Figure 1:
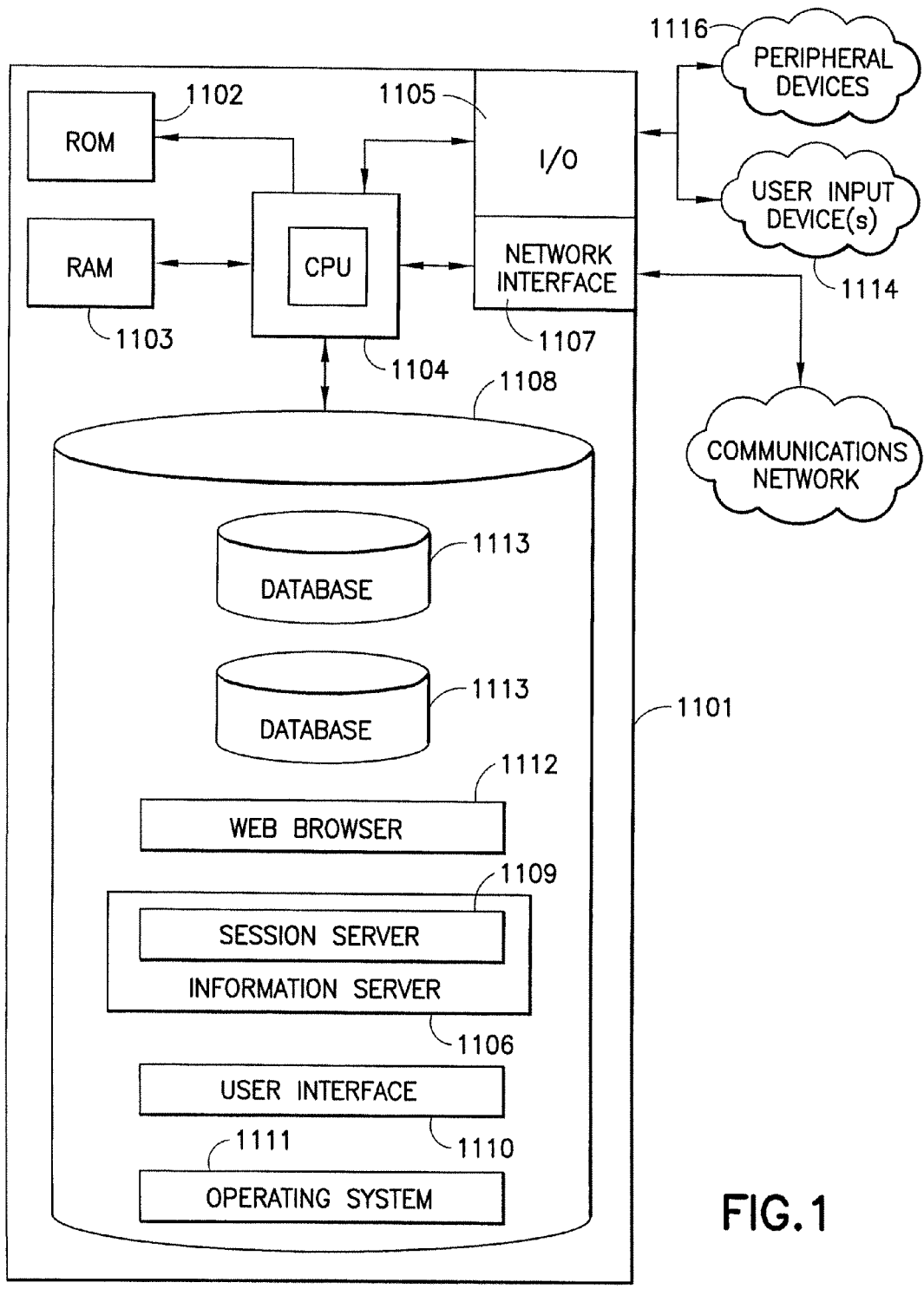
FIG. 1 illustrates a centralized controller according to one embodiment of the present invention.

FIG. 1 shows one embodiment of a system incorporating the present invention. In this embodiment, the system includes a centralized controller 1101 configured to receive information from one or more users from user input device(s) 1114. The centralized controller may also receive information from a communications network 1115 through its input/output (I/O) facility 1105, preferably, via a network interface 1107. The I/O facility is capable of both receiving and sending information. Peripheral devices 1116 may be attached to the centralized controller for any number of purposes including, but not limited to: printers for output, scanners for input, additional or alternative storage devices for data storage and retrieval, network interfaces for communication, and other like devices.

A typical centralized controller may be based on common computer systems that may include, but are not limited to, components such as: a central processing unit (CPU) 1104, random access memory (RAM) 1103, read only memory 1102, and a local storage device 1108. The CPU is electronically coupled to each of the central controller's other elements. The CPU comprises at least one high-speed data processor adequate to execute program modules for executing user or system-generated requests. These modules are described in FIGS. 2 through 7. Preferably, the CPU is a conventional microprocessor such as an Intel Pentium Processor. The CPU interacts with RAM, ROM, and storage device(s) to execute stored program code according to conventional data processing techniques.

The local storage device may contain modules. These modules may include, but are not limited to, a session server 1109, a user interface 1110, an operating system 1111, a web browser 1112, an information server 1106, and a database 1113. These modules may be stored and accessed from the local storage device(s) or from storage devices accessible through I/O. Although these modules typically and preferably are stored in a local storage device, they may also be stored in ROM, RAM, peripheral devices or in remote storage facilities through a communications network.

The operating system is executable program code enabling the operation of a centralized controller. The operating system facilitates access of storage devices, I/O, network interfaces devices, peripheral devices, etc. The operating system preferably is a conventional product such as a Unix operating system or Microsoft Windows NT. The operating system, once executed by the CPU, interacts with ROM, RAM, I/O, peripheral devices, user input devices, storage devices, communications networks, program modules, and data, et al. The operating system may also include communication protocols that allow the centralized controller to communicate with other entities through a communications network. One such protocol that may be used is TCP/IP.

Distributed Controllers

FIG. 2 shows another embodiment of a system incorporating the present invention. In this embodiment, the centralized controller 1101 embodiment of FIG. 1 has been decentralized into components: a user interface controller 2201 or alternatively a user interface device 2202, a session server controller 2203, a web browser controller 2204, a database controller 2205, and an information server controller 2206.

A user interface controller is configured similarly to the centralized controller of FIG. 1 except it does not require a database, session server, information server, or web browser. A user interface 2110 is stored program code that is executed by the CPU. The user interface is responsible for receiving either user or system-generated requests.

In alternative embodiments, a user interface device 2202 may take the place of or be used in conjunction with a user interface controller. The user interface device may be a telephone, a consumer electronics online access device (e.g. Phillips Inc.'s WebTV), PDA or the like.

In one embodiment, a centralized server 1101 is configured as a web server, and conventional communications software such as Netscape Navigator web browser may be used to transmit a conditional purchase offer (CPO). In one embodiment, the CPO centralized server 1101 has a web page on the web, allowing a buyer to provide information through the interface of the conventional web browser software. In one embodiment, the buyer selects the subject of the goods she wishes to purchase by selecting from a list of possible subjects. Subjects might include airline tickets, hotel rooms, rental cars, insurance, mortgages, clothing, etc. After the subject is selected, a form is displayed on a video display monitor of a buyer interface. This form is an electronic contract with a number of blanks to be filled out by the buyer, with each blank representing a condition of a CPO.

An information server controller is comprised similarly to the centralized controller of FIG. 1 except it does not require a session server, database, web browser, or user interface. An information server 2106 is stored program code that is executed by the CPU. The information server may be a conventional Internet information server such as Microsoft's Internet Information Server revision 4.0. The information server may allow for the execution of program modules through facilities such as C++, Java, JavaScript, ActiveX, CGI scripts, ASP, or any like facility with regular expression (regex) abilities on the server side. An information server typically takes requests from a web browser and provides results to a web browser; however, an information server can take requests from user interfaces as well. The information server may also take system requests. In alternative embodiments, a information server may be integrated into a user interface or vice versa, thus, combining the functionality of both.

A session server controller is configured similarly to the centralized controller of FIG. 1 except it does not require a database, web browser, information server, or user interface. The session server 2109 is stored program code that is executed by the CPU. A session server takes requests from a user interface and provides results to a user interface. The session server may also take system requests. In FIG. 1 the session server is implemented within an information server, however, the session server may also be implemented independently and interact with an information server through provided APIs as illustrated in FIGS. 2 2106 and 2109.

A database controller is configured similarly to the centralized controller of FIG. 1 except it does not require a session server, web browser, information server, or user interface. A database(s) 2113 is stored program code that is executed by the CPU and it is stored data processed by the CPU. A database takes requests from a session server and provides results to a session server. The database may also take system requests. In an alternative embodiment, a session server may be integrated into a database or vice versa, thus, combining the functionality of both. In yet another alternative embodiment, a session server may be integrated into a user interface or vice versa, thus, combining the functionality of both.

A web browser controller is configured similarly to the centralized controller of FIG. 1 except it does not require a session server, database, information server, or user interface. A web browser 2112 is stored program code that is executed by the CPU. The web browser may be a conventional hypertext viewing application such as Microsoft Internet Explorer or Netscape Navigator. The web browser may allow for the execution of program modules through facilities such as Java, JavaScript (preferably revision 1.2 or greater), ActiveX or any like facility with regular expression (regex) abilities. A web browser takes requests from a user interface and provides results to a user interface. The web browser may also take system requests. In alternative embodiments, a web browser may be integrated into a user interface or vice versa, thus, combining the functionality of both.

The functionality of the user interface controller, session server controller, database controller, information server controller, and web browser controller may be combined in any number of ways to facilitate deployment. To accomplish this, one may simply copy the executable code, first ensuring it has been compiled for the appropriate CPU of the controller for which it is destined, and/or data onto a local storage device of one of the various controllers. Similarly, the functionality of the user interface, session server, database, information server, and web browser may be combined in any number of ways to facilitate deployment. To accomplish this, one must simply integrate the components into one code base or in a facility that can dynamically load the components on demand in an integrated fashion.

System and Various Interactions

Figure 3:
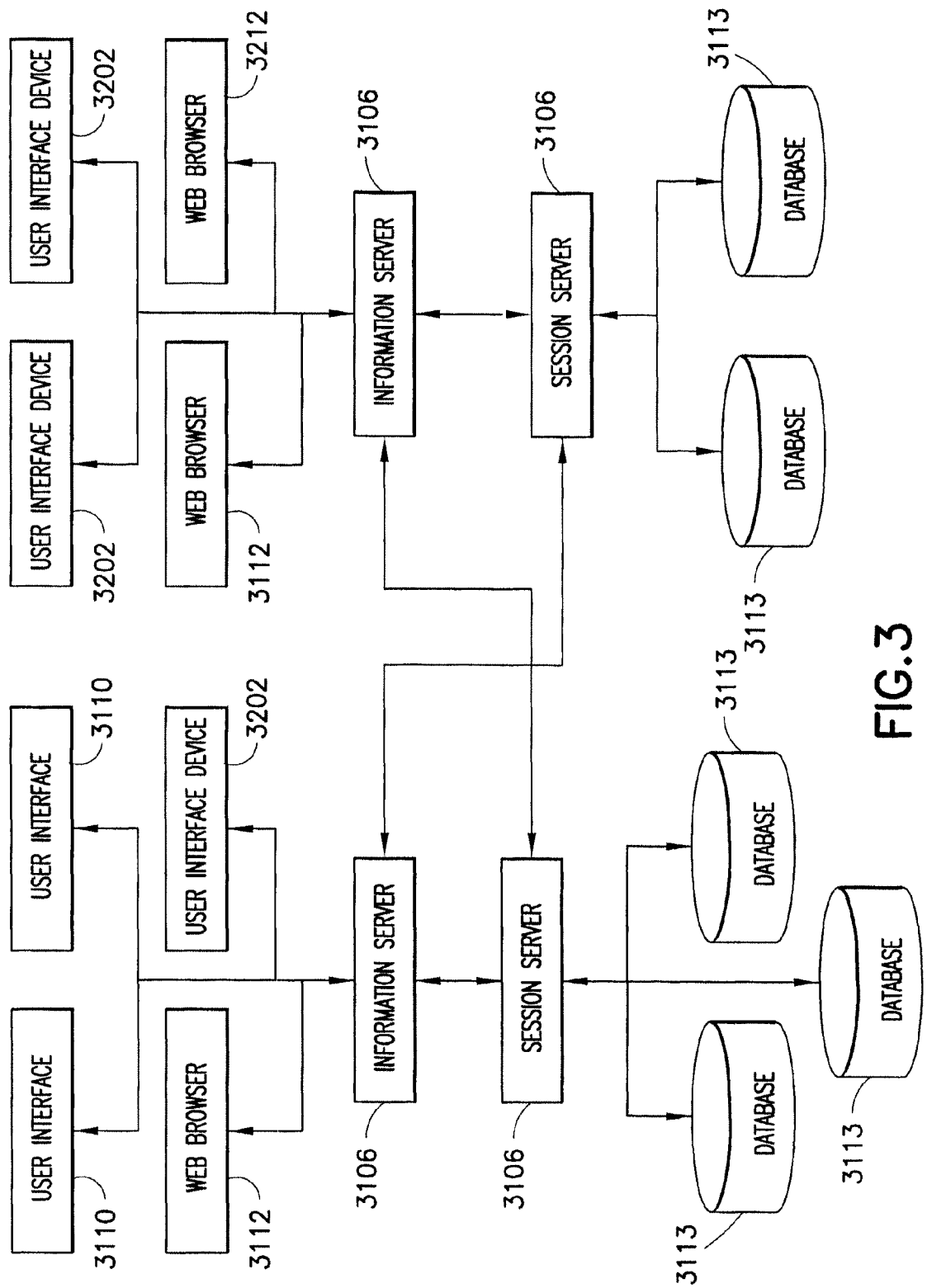
FIG. 3 illustrates another embodiment of the system and various interactions.

FIG. 3 shows an overview of the basic interaction of the system. The information server 3106 acts as an in-between for: a user interface 3110 on a system, a user interface device 3202, or a web browser 3112 taking requests. The information server can make further requests of a session server 3109 that itself may access one or more databases to access stored session states or other information. Both the information server and the session server may service multiple instances of any of the aforementioned. Also, there may be one or more instances of the session server and/or information server that may severally or jointly interact with one or more information servers 3106. Session servers service information servers. In rum, the information servers and/or session servers may interact and service one or more databases 3113 for various purposes such as, but not limited to: validation rules, session state storage, and electronic commerce (E-commerce) order fulfillment. FIG. 3 shows that the session server and information server may service multiple sources at once, and that the session server and information server may access more than one database. For example, any information server may request a session state from any number of session servers; thus allowing a user's session to be maintained and provided by any number of session servers, thus increasing performance and fault tolerance.

Web Pages

Figure 4:
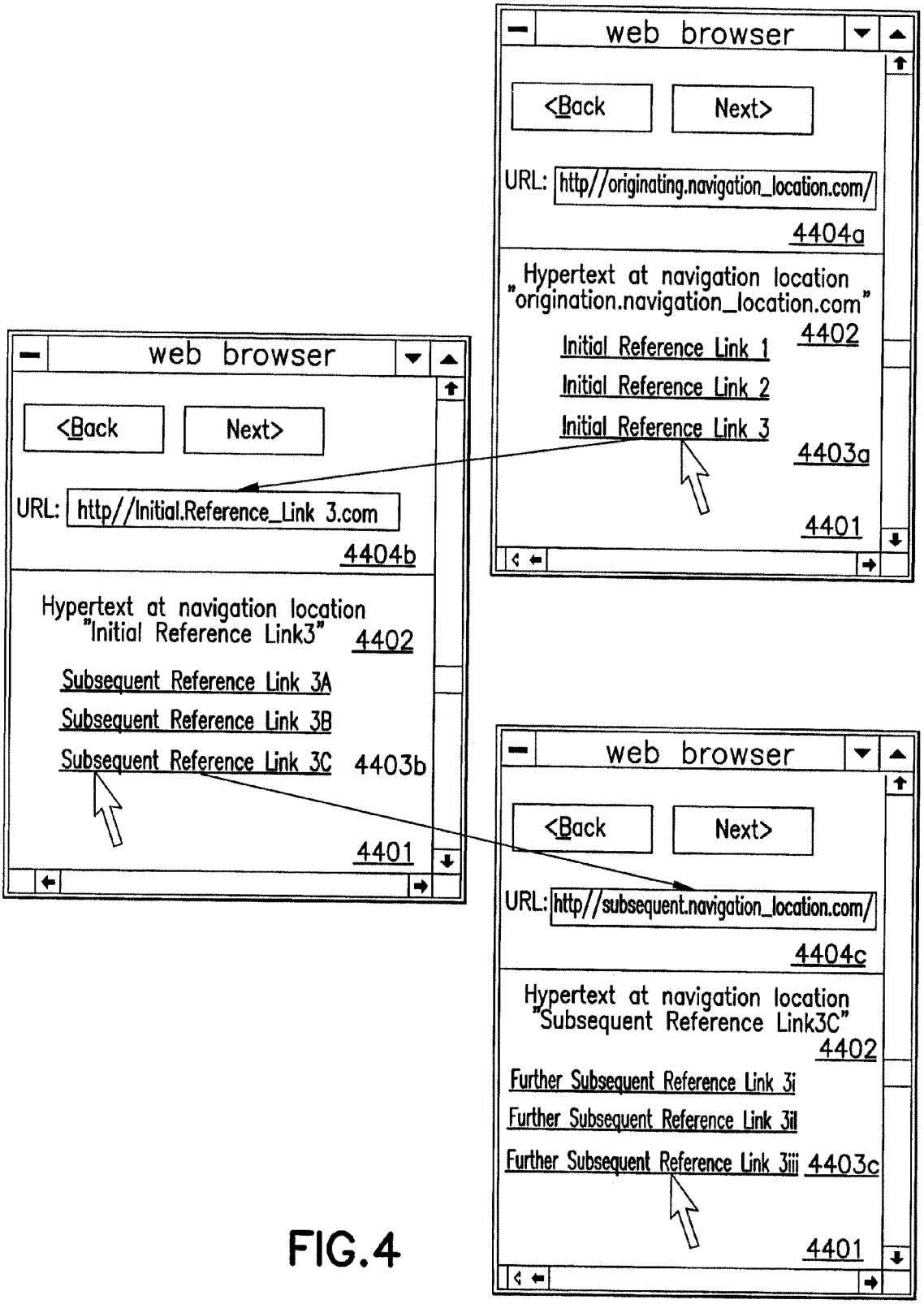
FIG. 4 illustrates web pages, hypertext, reference and proximal links.

FIG. 4 shows web pages 4401 with hypertext 4402 and reference links 4403 at various navigation locations 4404. An originating navigation location 4404a references hypertext that may have initial reference links 4403a. These initial reference links are proximal links to the originating navigation location.

One may view hypertext at an initial reference navigation location 4404b by traversing an initial reference link. The subsequent reference links 4403b found in the hypertext found at the initial reference navigation location are also proximal links, however, they are one reference less proximal (i.e. one "hop" away) to the originating navigation location.

One may view hypertext at a subsequent reference navigation location 4404c by traversing a subsequent reference link. The further subsequent reference links 4403c found in the hypertext found at the subsequent reference navigation location are also proximal links, however, they are two references less proximal (i.e. two "hops" away) to the originating navigation location.

Persistent Session

Figure 5:
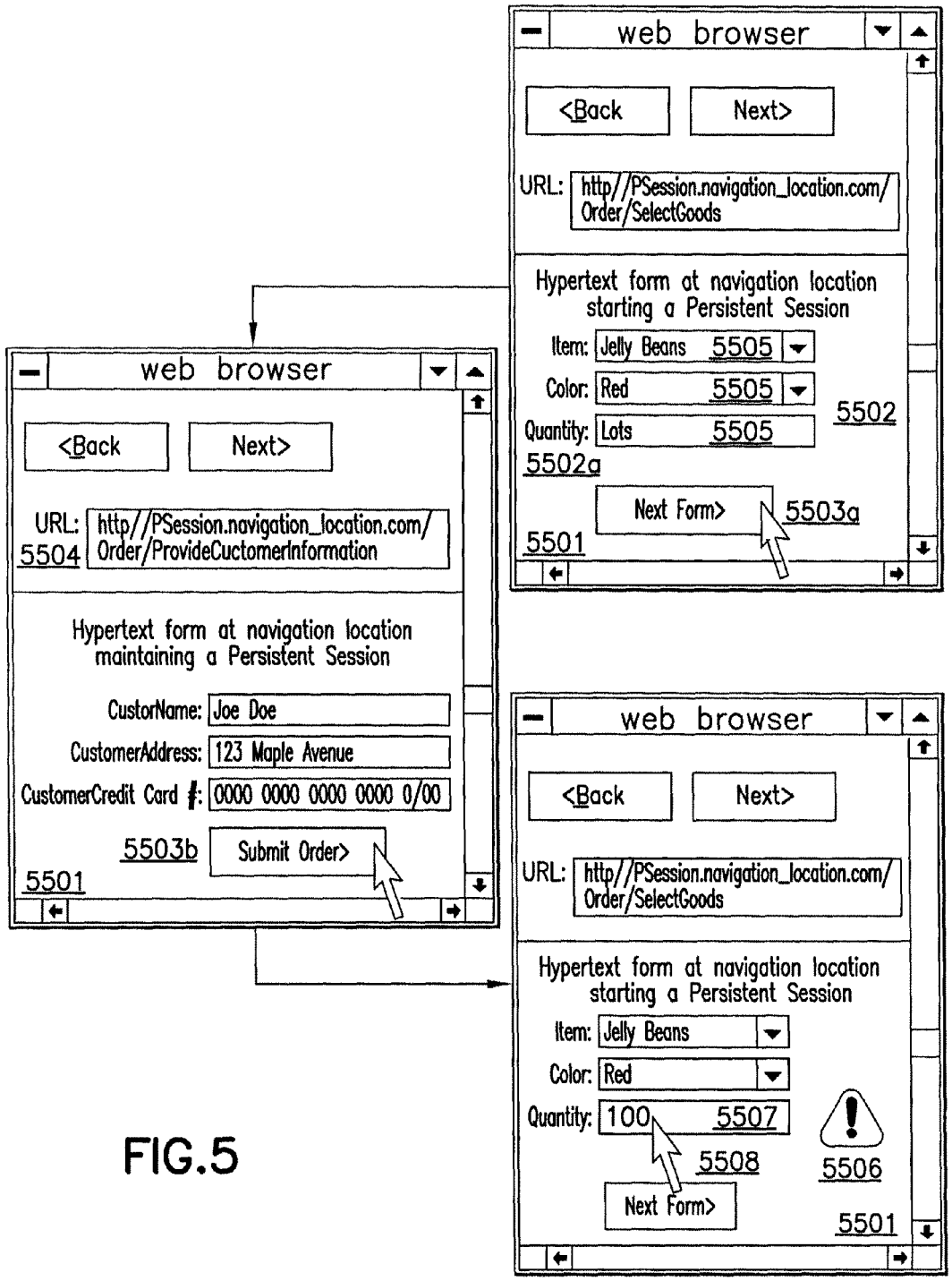
FIG. 5 illustrates a persistent session in progress.

FIG. 5 illustrates a persistent session in progress. This illustration is for purposes of example only, and in no way should be considered a limited application or implementation of the present invention. Initially, a web browser displays a web page that starts a persistent session and contains various web form fields 5501. This web page is illustrated with an example order for jelly beans, however, any number of uses may be employed for maintaining a persistent session. The user enters items into web fields 5502. After having entered information into each of the web fields the user may advance to the next web form segment by engaging a button 5503a or other facility of the like designed to advance the web browser to another web form segment by employing standard data processing techniques. Upon engaging the next web form segment button, the first session state will be saved and the web browser will advance to the next web form segment 5504. In this web page, the user may enter more information into web fields; in this example the user provides customer information. Upon completion of these fields, the user may engage a button triggering the advance to the next web form segment 5503b, thereby saving the second session state, i.e., doing so will send the information entered into the web form to a session server via HTTP or other such transfer protocols and/or elsewhere as described in FIGS. 6 and 7. After submitting the order 5503b at the end of the web form segments, an information server might check for the validity of entries. In this example, the user entered wrong information into the quantity field 5502a in the first session state. Having access to saved session states allows the web browser to restore the first session state 5501 so that the user can access the web page without losing their information provision 5505, identify the error by marking 5506 and/or highlighting it 5507, and allow the user to modify the entry 5508. In this example the user changed the quantity entry from "Lots" to "100."

Persistent Session Creation

Figure 6:
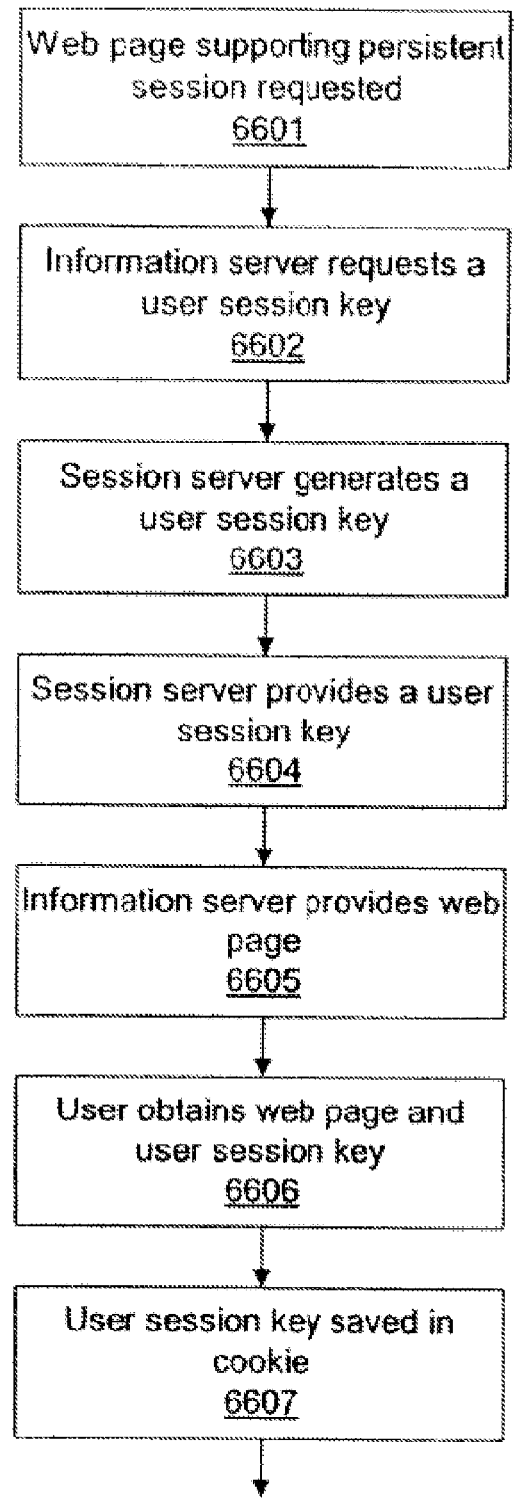
FIG. 6 is a flowchart illustrating a persistent session creation system.

FIG. 6 outlines a persistent session creation system, further describing the creation of a persistent state from FIG. 5. Initially, a web page supporting persistent sessions is requested by a user 6601. The user may make such a request by using a user interface such as a web browser.

An information server handling the request can identify that a persistent session is required by observing embedded codes using standard data processing techniques such as, but not limited to: string, compare, sort techniques, and the like. Upon obtaining a request for a persistent session, the information server requests a user session key 6602 from a session server. A web browser will generate an HTTP request and send it through a communications network to an information server. If the session server is integrated into the information server, this may be accomplished through standard data processing techniques such as, but not limited to: variable passing, object instance variable communication, internal messaging, shared memory space, or the like. The preferable embodiment will depend on the context of system deployment; i.e. factors such as the capacity of the underlying hardware resources. If the session server is external to the information server, obtaining the request may be accomplished through: shared files, process pipes, API information passage (i.e. inter application communication), or the like. Again, the preferable embodiment will depend upon the context of system deployment.

The session server generates a user session key 6603. This key is a unique session identifier and associates only with the user and no others. In one embodiment, the association employs the user's IP address for security reasons. However, a multitude of other standard data processing implementations may be employed such as, but not limited to: associating a session to a user supplied identifier and password, an encrypted user supplied key such as a PGP key, and other implementations of the like. One implementation generates a key based on the user's IP address, and a date and time stamp so that user session keys may be made to expire after a set time. This consequently creates a session that is unique across any number of distributed controllers.

Upon generating the user session key, the session server provides the session key 6604. The provision of the user session key may be implemented in any number of standard data processing embodiments such as, but not limited to: sending the user session key directly to the user; providing the user session key to the information server, which may in turn advance it to the user; providing the user session key to the information server, which may in turn bed the session key into a web page for the user. In one embodiment, the key is imbedded into a web page, thus, reducing the number of client-server transfers.

Upon provision of a user session key, an information server provides a web page 6605. In alternative embodiments, the provision of the requested web page may occur at any point after it is requested. Upon making the user session key and requested web page available, the user obtains both 6606. The order in which the user obtains the page and/or user session key is not important, however, one embodiment will provide the user with the user session key imbedded in the web page to increase transfer efficiency.

Upon obtaining the user session key, the session key is saved 6607, in one embodiment, on the client within a cookie. Alternatively, the user session key may also be saved on the server and provided to users upon the provision of uniquely identifying information such as, but not limited to: a unique identifier (e.g. a user name) and password, an IP address, a combination of both, and others of the like. However, it is preferable to employ the client for saving the user session key to reduce client-server transfers.

Persistent Session Navigation

Figure 7:
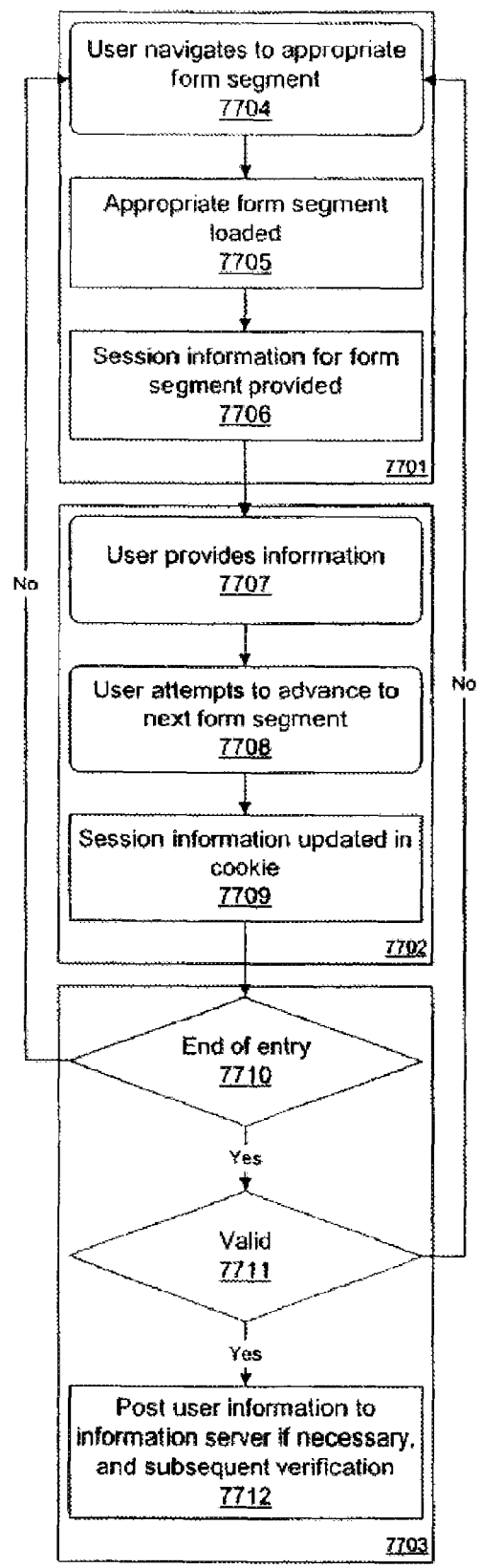
FIG. 7 is a flowchart illustrating a persistent session navigation system.

FIG. 7 outlines a persistent session navigation system (PSNS), and further describes a persistent session of FIGS. 5 and 6. In one embodiment, a persistent session navigation system is comprised of a traverse and recall subsystem 7701, a provide and save subsystem 7702, and optionally of a verification subsystem 7703. However, employing standard development techniques, the PSNS may be implemented by not only reordering the subsystems, but also by combining and intermeshing the subsystems.

Upon the creation of a persistent session as detailed in FIG. 6, a user will navigate to an appropriate form segment 7704. Thereafter, the appropriate form segment is provided 7705 employing standard data processing techniques such as, but not limited to, obtaining the web page (segment) from: cache, in memory, an information server, or other facility of the like. Upon the user's navigation to the appropriate form segment, session information for the form segment is provided 7706, employing standard data processing techniques such as, but not limited to, obtaining the session information from: cache, a file (e.g. a cookie), a session server, an information server, or other facility of the like. Of course, if a session has just been created, and no modifications have been made, there will be no session state information to provide.

In one embodiment, session data (i.e. session information) includes text entries made into web form fields, (pop-up) menu selections, user interface selections (e.g., check boxes), and or the like. In one embodiment, the session data is saved as HTML, ASCII text, and or the like. In alternative embodiments, the session data may be saved as binary, and or the like formats. Session data may be provided 7706 upon any triggering event to a session server and or local storage. In one embodiment, the session update occurs when selecting a button, e.g., 5503a of FIG. 5. The button might generated by, contain, and/or be associated with HTML, Javascript, and/or the like, which takes the user entries in a web form, i.e., session data, and sends them to a session server and/or local storage. In another embodiment, a web page may have HTML, Javascript, and or the like embedded within, which periodically executes sending session data updates to a session server and/or local storage.

Upon the provision of a web page 7705 or 6605 of FIG. 6, a user may provide information 7707. Typically, the provision of information may be accomplished as outlined in FIG. 5. Upon the user's provision of information, which may also include the provision of no information, the user may attempt to advance to the next form segment 7708. The next form segment may be another web page, or just another section of a web page, or the like. The user may attempt to advance to the next form segment as outlined in FIG. 5 by selecting a link or other like mechanisms.

Upon the user's attempt to advance to the next form segment, the session state is updated 7709. A session state is a session key with associated session data. In one embodiment, both the session key and session data are stored together on a session server. In an alternative embodiment, session keys may be saved separate from associated session data, i.e., session keys may be stored on a session server with references to the locations of associated session data. In one embodiment, a session server will save every session state update, i.e., user entered web form data sent at every triggering update event; such an embodiment allows for stepping back in time through the progression of a user data entry session. In an alternative embodiment, only a single session state is maintained and updated at the session server. In yet another embodiment, session data is saved in a cookie, file, and/or the like local storage facility and only a session key is saved at the session server; this embodiment reduces network transactions and server resource requirements. In one embodiment, local cookie saving of session data may be achieved by generating a session key that references a local cookie, file name, and or the like.

In an alternative embodiment, the session state may be updated with finer granularity; i.e. the session state may be updated as the user provides information going from web form field to field. The session state information may be updated to any number of facilities such as, but not limited to: memory, cache, file(s) (i.e. cookie(s)), session server(s), information server(s), or like facility. In one embodiment, the session state information is saved to a cookie on the client to minimize client-server transactions. Preferably, a session server will maintain a corresponding time stamped key. Thus, if a transaction takes too long to be submitted, e.g. more than some set amount of time the session server will purge its session key and not allow the updating or posting of a session. This embodiment, although not limiting, is advisable for security reasons.

Upon a user's attempt to advance to a next form segment, the PSNS may check if there are anymore entries required to complete an entry transaction 7710. If there are more entries required, then the user will navigate to the appropriate form segment 7704. Thus, subsequent cycling from 7701 to 7703 of multi-part web pages may occur. Upon reaching the end of a web form 7710, the session information may be validated 7711. If the session information is found to be invalid by the information server or like facility, then the user will navigate to the appropriate form segment so that a correction may be made as illustrated in FIG. 5 by engaging web form data entry elements.

Upon obtaining valid session information 7711, the information may be posted to the information server and any subsequent verification may be provided 7712. For example, an order may be posted and the order information may be processed by modules designed for such a purpose; and once the processing is complete, the user may be presented with a new web page verifying the completion of the transaction. Of course, actual transmission of the user information may not be required if session state updating 7709 was provided to a session server or information server continuously; in such an embodiment, the posting would simply instruct the PSNS to obtain the latest session information from the server. The latest session information may be identified by time and date stamps provided by the operating system, database record creation time date stamps, and or the like.

It should be understood that the above description is only representative of illustrative embodiments. For the convenience of the reader, the above descriptions have focused on a representative sample of all possible embodiments, a sample that teaches the principles of the invention. The description has not attempted to exhaustively enumerate all possible variations. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that the embodiments and variations shown and described herein are merely illustrative of the principles of this invention and that various modifications may be implemented without departing from the scope and spirit of the invention.

What is claimed is:

1. A processor-implemented method of persistent session state maintenance, comprising:
generating, via a processor, a user session including a unique user session identifier and a session storage suitable for storing user session state values;
providing a web form containing a plurality of web form input elements suitable for rendering in a user browser;
receiving an indication that a first web form input element has been updated and a first web form input value;
updating the session storage using the first web form input value;
receiving an indication that a second web form input element has been updated and a second web form input value, wherein the indication that the second web form input element has been updated is created without providing a second web form; and
updating the session storage using the second web form input value.

2. The method of claim 1 wherein the web form containing a plurality of web form input elements is configured for streaming web form input element updates.

3. The method of claim 1, wherein the indication that the first or second web form input element has been updated is generated when a user changes web form input element focus.

4. The method of claim 1, wherein the indication that the first or second web form input element has been updated is generated upon the traversal of a web form segment.

5. The method of claim 1, wherein the first or second web form input element is a text box suitable for user text input.

6. The method of claim 1, wherein the first or second web form input element is a checkbox.

7. The method of claim 1, wherein the first or second web form input element is a menu selection.

8. The method of claim 1, wherein the first or second web form input element is a user interface selection.

9. A processor-implemented persistent session state maintenance system, comprising:
means to generate, via a processor, a user session including a unique user session identifier and a session storage suitable for storing user session state values;
means to provide a web form containing a plurality of web form input elements suitable for rendering in a user browser;
means to receive an indication that a first web form input element has been updated and a first web form input value;
means to update the session storage using the first web form input value;
means to receive an indication that a second web form input element has been updated and a second web form input value, wherein the indication that the second web form input element has been updated is created without providing a second web form; and
means to update the session storage using the second web form input value.

10. The system of claim 9 wherein the web form containing a plurality of web form input elements is configured for streaming web form input element updates.

11. The system of claim 9, wherein the indication that the first or second web form input element has been updated is generated when a user changes web form input element focus.

12. The system of claim 9, wherein the indication that the first or second web form input element has been updated is generated upon the traversal of a web form segment.

13. The system of claim 9, wherein the first or second web form input element is a text box suitable for user text input.

14. The system of claim 9, wherein the first or second web form input element is a checkbox.

15. The system of claim 9, wherein the first or second web form input element is a menu selection.

16. The system of claim 9, wherein the first or second web form input element is a user interface selection.

17. A processor-implemented method of persistent session state maintenance, comprising:
generating a user session including a unique user session identifier and a session storage suitable for storing user session state values;
providing a web form containing a plurality of web form input elements suitable for rendering in a user browser;
receiving an indication that a web form input element has been updated and a first web form input value;
updating the session storage using the first web form input value;
receiving an indication that the web form input element has been updated and a second web form input value; and
updating the session storage using the second web form input value, wherein the session storage retains both the first and second web form input values.

18. The method of claim 17, additionally comprising:
receiving a request to recall a previous value of the web form input element; and
providing the first web form input value.

19. The method of claim 18, wherein each web form input value stored in the session storage is associated with a time designation.

20. The method of claim 19, wherein the request to recall a previous value of the web form input element additionally includes a time designation corresponding to the desired value to retrieve of the web form input element.

21. A processor-implemented method of persistent session state maintenance, comprising:
generating a user session including a unique user session identifier and a session storage suitable for storing user session state values;
providing a web form containing a plurality of web form input elements suitable for rendering in a user browser;
receiving an indication that a web form input element has been updated and a first web form input value;
updating the session storage using the first web form input value;
receiving an indication that the web form input element has been updated and a second web form input value; and
updating the session storage using the second web form input value, wherein the session storage retains both the first and second web form input values.

22. The method of claim 21, additionally comprising:
receiving a request to recall a previous value of the web form input element; and
providing the first web form input value.

23. The method of claim 22, wherein each web form input value stored in the session storage is associated with a time designation.

24. The method of claim 23, wherein the request to recall a previous value of the web form input element additionally includes a time designation corresponding to the desired value to retrieve of the web form input element.

* * * * *